United States Patent [19]
Fujita

[11] Patent Number: 6,148,186
[45] Date of Patent: Nov. 14, 2000

[54] METHOD OF COMBINING RECEIVED SIGNAL OF DIVERSITY TYPE RADIO DEVICE AND DIVERSITY TYPE RADIO DEVICE

[75] Inventor: Noriyuki Fujita, Saitama, Japan

[73] Assignee: NEC Corporation, Tokyo, Japan

[21] Appl. No.: 08/917,722

[22] Filed: Aug. 27, 1997

[30] Foreign Application Priority Data

Aug. 27, 1996 [JP] Japan ................................ 8-225106

[51] Int. Cl.[7] .................................................. H04B 17/02
[52] U.S. Cl. ........................ 455/137; 455/273; 375/347
[58] Field of Search ..................................... 455/133, 136, 455/137, 138, 139, 132, 278.1, 131, 504, 273; 375/206, 331, 347, 323, 267, 136

[56] References Cited

U.S. PATENT DOCUMENTS

| | | | |
|---|---|---|---|
| 3,934,204 | 1/1976 | Hill | 455/136 |
| 4,373,207 | 2/1983 | Hecken | 455/139 |
| 4,397,036 | 8/1983 | Hirade et al. | 455/137 |
| 4,752,941 | 6/1988 | Takahara et al. | 375/347 |
| 4,805,229 | 2/1989 | Mobley | 455/138 |
| 5,109,392 | 4/1992 | McDonald | 375/331 |
| 5,203,023 | 4/1993 | Saito et al. | 455/133 |
| 5,461,646 | 10/1995 | Anvari | 375/347 |
| 5,465,271 | 11/1995 | Hladik et al. | 375/267 |
| 5,761,252 | 6/1998 | Iinuma | 375/347 |
| 5,787,112 | 8/1998 | Murai | 375/206 |
| 5,889,826 | 3/1999 | Takahashi | 455/132 |

Primary Examiner—Edward F. Urban
Assistant Examiner—Congvan Tran
Attorney, Agent, or Firm—Sughrue, Mion, Zinn, Macpeak & Seas, PLLC

[57] ABSTRACT

Detection outputs 103 and 104 of phase-detection sections 9 and 19 of two reception circuits are input to phase difference detection sections 10 and 20, respectively. A detection output 103 indicating an instantaneous phase amount of each symbol as each phase output of a QPSK received signal is converted into phase difference detection outputs 105 and 106 each indicating a difference between the respective symbols. The output is input to a combination process section 23 where amplitude signals 101 and 102 are operated as weighting factors and vector combination so as to obtain a combination signal.

5 Claims, 3 Drawing Sheets

METHOD OF COMBINING RECEIVED SIGNAL OF DIVERSITY TYPE RADIO DEVICE AND DIVERSITY TYPE RADIO DEVICE

BACKGROUND OF THE INVENTION

The present invention relates to a method of combining a received signal of a diversity type radio device and, more particularly, to the method of combining a received signal by delay detecting a received signal of a PSK modulation wave and combining the detected received signal by a maximum ratio combination method(RAKE combination).

The conventional diversity type radio device as described above is used in, for example, a base station of a PHS system, a construction of which is shown in FIG. 3. FIG. 3 is a block diagram of the conventional art. This conventional art is of a space diversity type having two antennas set apart at a predetermined distance. Each 2-branch reception circuit phase-detects a received signal of a PSK (or QPSK) modulation wave by a delay detection method and then weights the 2-branch detection output with a received amplitude level for vector combining with the RAKE combination.

Referring to FIG. 3, a received signal input to antennas 31 and 41 passes through BPFs (Band Pass Filter) 32 and 42, amplifiers at a high frequency with increased width 33 and 43, and BPFs 34 and 44. Each signal is mixed at an output frequency of a local oscillator OSC 50 by mixers 35 and 45 at a first stage, respectively. The mixed signal passes through BPFs 36 and 46, IF amplifiers 37 and 47 through which the signal is mixed down into a primary intermediate frequency. The signal is further mixed at an output frequency of an OSC 51 by mixers 38 and 48 at a second stage, respectively and mixed down into a secondary intermediate frequency, which is input to phase detection sections 39 and 49. The mixers 38 and 48 detect a level amplitude value of the received signal and output amplitude signals 101 and 102.

The phase-detection sections 39 and 49 phase-detect the received signal. The detection output represents an instantaneous phase amount of each symbol as each phase output of the QPSK received signal, i.e., an absolute value of the phase amount.

Each of the detection outputs is input to a combination process section 52 where the amplitude signals 101 and 102 of the respective received signals are operated as weighting factors and vector synthesized, which is output as a combination signal. The combination signal is demodulated into a received data signal in a demodulation section 53.

The conventional method combines the wave detection outputs that have been phase detected. As the detection output represents the absolute value of the phase amount, the respective delay amounts of each group of the element of the reception circuit, BPFs 32 and 42, high frequency amplifiers 33 and 43 and the like are added to the absolute value. The aforementioned delay amount varies dependent on the respective elements. This may cause a phase difference in the detection output between two received signals, resulting in deteriorated combination output characteristics. The level of such deterioration also disperses dependent on the product, leading to inconsistent quality.

SUMMARY OF THE INVENTION

An objective of the present invention is achieved by a method of combining a received signal of the diversity type radio device of the present invention phase-detects each received signal of plural PSK modulation wave received by plural antennas through a delay detection method at a symbol of a phase signal forming the each received signal and weights a phase wave detection output at each symbol with an amplitude level of the received signal for vector combination. In this method, the vector combination is executed by converting the phase-detection output into a phase difference detection output indicating a phase difference between the symbols for weighting with the amplitude level.

The phase difference detection output can be obtained using the method for latching the phase-detection output at a clock frequency twice a frequency of a symbol clock extracted from the received signal and synchronized with the symbol, shifting the latch output with the symbol clock and summing the shift output and the latch output.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be described with reference to the accompanying drawings.

Figure 1:
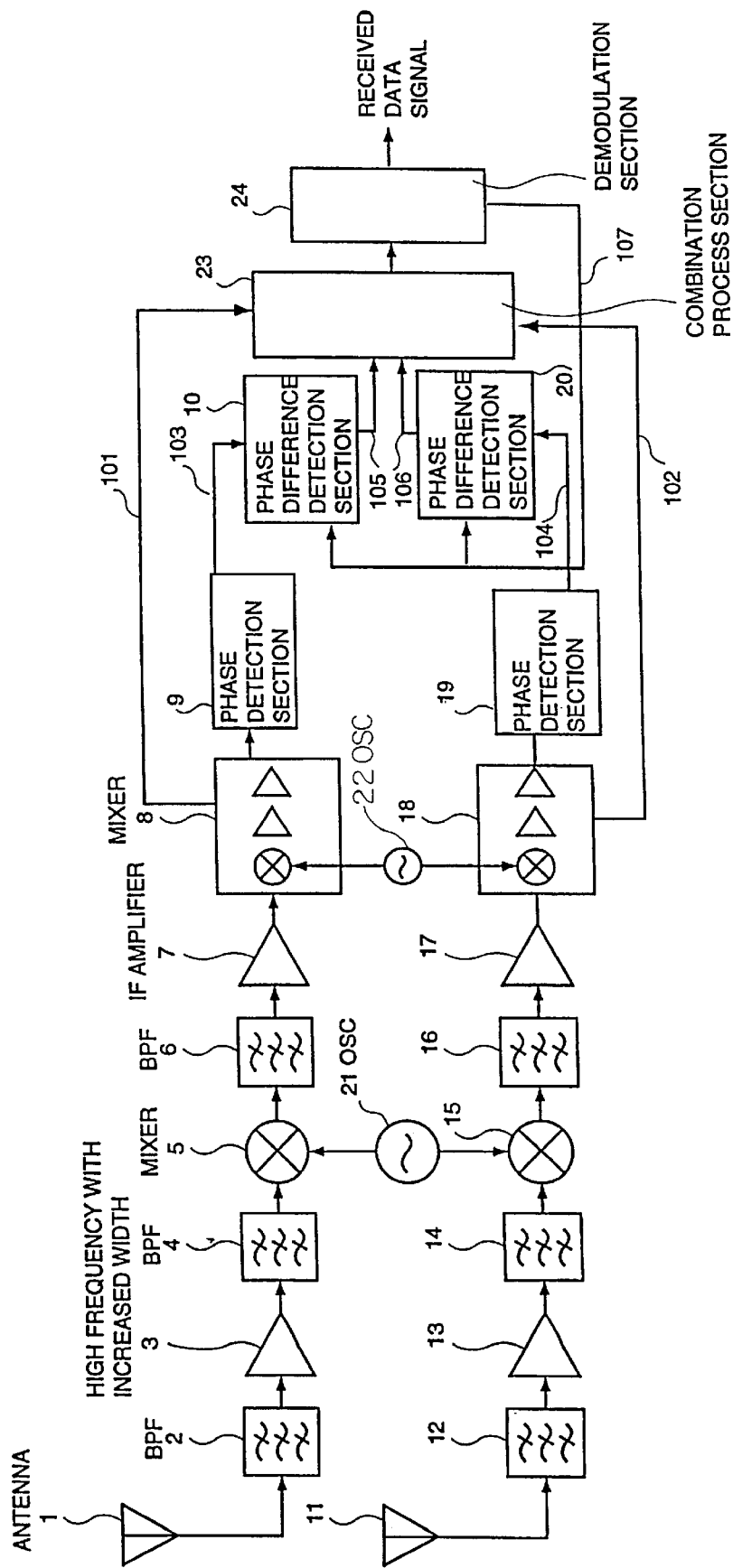
FIG. 1 is a block diagram showing an embodiment of the present invention.

An embodiment of the present invention is described referring to the drawings. FIG. 1 is a block diagram showing an embodiment of the present invention. This embodiment is formed as a space diversity type having two antennas set apart at a predetermined distance. 2-branch reception circuit phase-detects a QPSK modulation wave through a delay detection method, respectively. The 2-branch received signals are combined through a maximum ratio combination method(RAKE combination).

Referring to FIG. 1, each received signal input to antennas 1 and 11 passes through BPFs (Band Pass Filter) 2 and 12, amplifiers at a high frequency with increased width 3 and 13 and BPFs 4 and 14, then is mixed at an output frequency of a local oscillator OSC 21 by mixers 5 and 15 at a first stage, respectively and further passes through BPFs 6 and 16 and IF amplifiers 7 and 17 to be mixed down into a primary intermediate frequency. The signal is mixed at an output frequency of an OSC 22 by mixers 8 and 18 at a second stage, respectively to be mixed down into a secondary intermediate frequency, which is input to phase wave detection sections 9 and 19. Each of the mixers 8 and 18 detects a level amplitude value of the received signal and outputs amplitude signals 101 and 102, respectively.

The phase-detection sections 9 and 19 phase-detect the received signal. The resultant detection output represents the instantaneous phase amount of each symbol as each phase output of the QPSK received signal, i.e., the absolute value of the phase amount.

The detection outputs 103 and 104 are input to phase difference detection sections 10 and 20, respectively for detecting a phase difference detection output indicating the phase amount difference between one symbol and another.

Each of the detection outputs 105 and 106 is input to a combination process section 23 where the amplitude signals 101 and 102 of each received signal are operated as weighting factors and vector combined for outputting as a combination signal. The combination signal is demodulated into a transmission data signal in a demodulation section 24.

Figure 2:
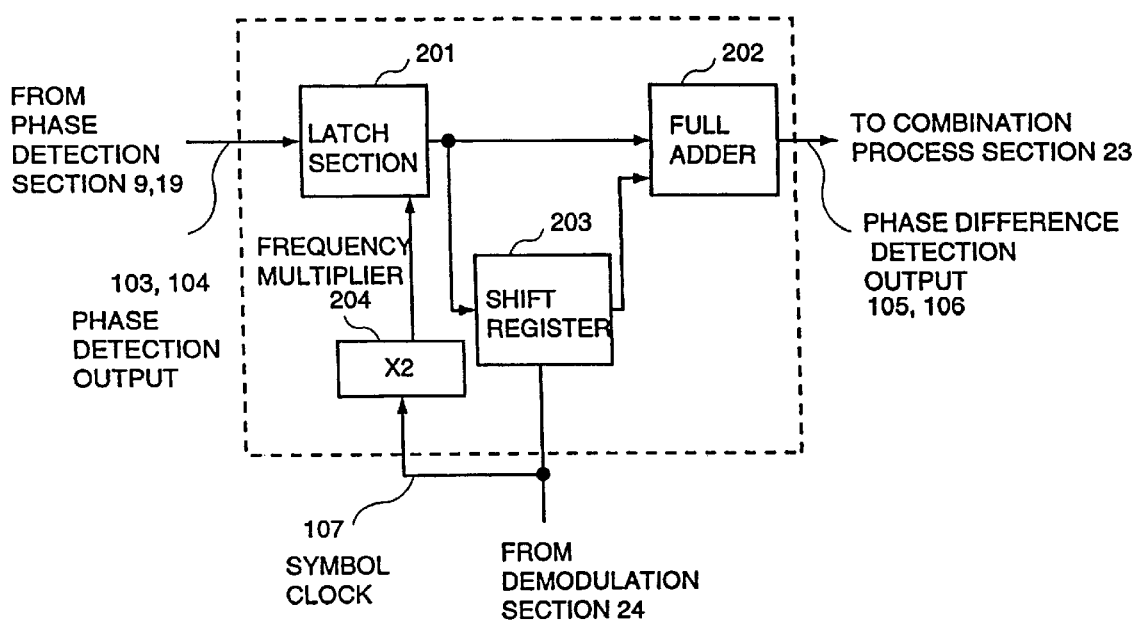
FIG. 2 is a block diagram of a phase difference detection section shown in FIG. 1.
Figure 3:
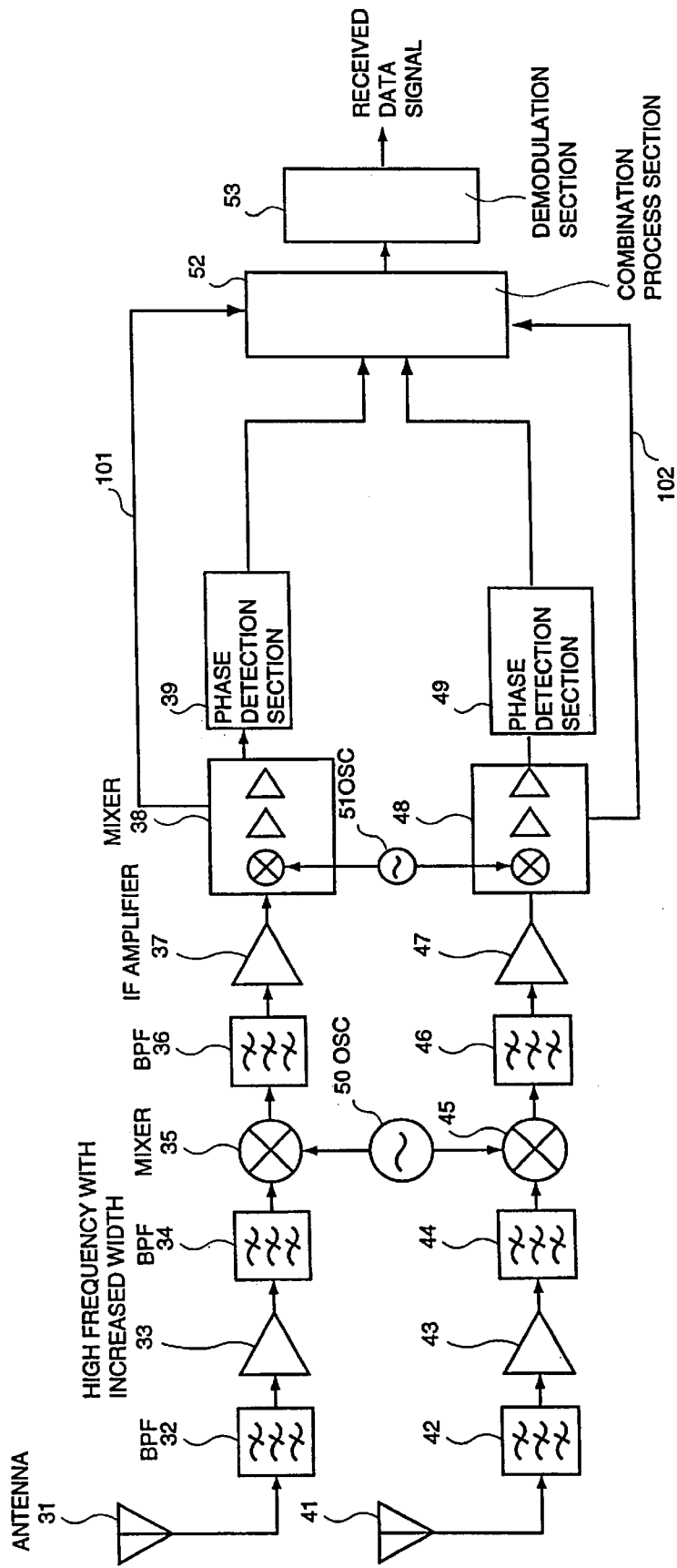
FIG. 3 is a block diagram of a conventional art.

Referring to FIG. 2, each operation of the phase difference detection sections 10 and 20 is described (likewise executed in the phase difference detection section 20). An input phase-detection output 103 is latched at a clock twice a symbol clock 107 in a latch section 201 and output to a shift register 203 and a full adder 202. The shift register 203 shifts the phase-detection output at each symbol clock, which is output to the full adder 202 again. The full adder 202 sums two signals (offset) to obtain the difference data of the phase-detection output. At this time the shift register 203 outputs at the symbol clock. Accordingly the full adder 202 outputs a phase difference detection output 105 between one symbol and another. The symbol clock 107 is extracted at the demodulation section 24.

As described above, in the method of combining a received signal of a diversity type radio device of the present invention, a relative value (phase difference) is used as the phase amount of the phase-detection output intended for combining instead of using the absolute value so as not to be influenced by delays of the respective element groups that form the reception circuit. As a result, the combination output characteristics hardly disperses, thus assuring the consistent product quality.

The entire disclosure of Japanese Patent Application No. 8-225106 filed on Aug. 27, 1996 including specification, claims, drawing and summary are incorporated herein by reference in its entirety.

What is claimed is:

1. The method of combing a received signal of a diversity type radio device comprising the steps of:

generating a phase-detection output at a symbol by phase-detecting each received signal of plural PSK modulation waves received by plural antennas through a delay detection at a symbol of a phase signal forming said each received signal;

converting said phase-detection output at said each symbol into a phase difference detection output indicating a phase difference between said symbols;

weighting said phase difference wave detection outputs with an amplitude level for combination;

wherein said step of converting into said phase difference detection output further comprises the steps of:

extracting a phase-detection output from a received signal and latching said phase-detection output at a clock frequency twice a frequency of a symbol clock synchronized with a symbol;

shifting said latched phase-detection output with said symbol clock; and generating a phase difference detection output by summing said latched phase-detection output and said phase-detection output shifted with said symbol clock.

2. The diversity type radio device comprising:

plural units of phase-detection means provided for a received signal and for phase-detecting a received signal of a PSK modulation received by an antenna through a delay detection at a symbol of a phase signal forming said each received signal;

plural units of phase difference detection means provided corresponding to said phase-detection means and for generating a phase difference detection output indicating a phase difference between said symbols by detecting a phase difference of said phase-detection outputs between said symbols based on a phase-detection output of said phase wave detection means;

combining means for weighting each phase difference detection output with an amplitude level and combining said weighted phase difference detection outputs;

wherein said phase difference detection means further comprises:

latch means for latching a phase-detection output at a clock frequency twice a frequency of a symbol clock synchronized with a symbol;

a shift register for shifting a phase-detection output being output from said latch means with said symbol clock; and means for generating a phase difference detection output by calculating a difference between a phase-detection output being output from said latch means and a phase-detection output being output from said shift register.

3. A diversity type radio device comprising:

plural units of phase-detection means provided for a received signal and for generating a phase-detection output by phase-detecting a received signal of a PSK modulation received by an antenna through a delay detection at a symbol of a phase signal forming said each received signal;

plural units of latch means provided corresponding to said phase-detection means and for latching said phase-detection output at a clock frequency twice a frequency of a symbol clock synchronized with a symbol;

plural shift registers provided corresponding to said latch means and for shifting a phase-detection output being output from said latch means with said symbol clock;

plural units of difference calculation means provided corresponding to said latch means and said shift register and for outputting a phase difference wave detection output by calculating a difference between a phase-detection output being output from said latch means and a phase-detection output being output from said shift register; and combining means for weighting said each phase difference detection output with an amplitude level and combing said weighted phase difference detection outputs.

4. The diversity type radio device comprising:

plural units of phase-detectors provided for a received signal and for phase-detecting a received signal of a PSK modulation received by an antenna through a delay detection at a symbol of a phase signal forming said each received signal;

plural units of phase difference detectors provided corresponding to said phase-detectors and for generating a phase difference detection output indicating a phase difference between said symbols by detecting a phase difference of said phase-detection outputs between said symbols based on a phase-detection output of said phase wave detectors; and combiner for weighting each phase difference detection output with an amplitude level and combining said weighted phase difference detection outputs;

wherein said phase difference detectors further comprise:

latch for latching a phase-detection output at a clock frequency twice a frequency of a symbol clock synchronized with a symbol;

a shift register for shifting a phase-detection output being output from said latch with said symbol clock; and adder for generating a phase difference detection output by calculating a difference between a phase-detection output being output from said latch and a phase-detection output being output from said shift register.

5. A diversity type radio device comprising:

plural units of phase-detectors provided for a received signal and for generating a phase-detection output by phase-detecting a received signal of a PSK modulation received by an antenna through a delay detection at a symbol of a phase signal forming said each received signal;

latches provided corresponding to said phase-detectors and for latching said phase-detection output at a clock frequency twice a frequency of a symbol clock synchronized with a symbol;

shift registers provided corresponding to said latches and for shifting a phase-detection output being output from said latches with said symbol clock;

adders provided corresponding to said latches and said shift registers and for outputting a phase difference wave detection output by calculating a difference between a phase-detection output being output from said latches and a phase-detection output being output from said shift register; and combiner for weighting said each phase difference detection output with an amplitude level and combining said weighted phase difference detection outputs.

* * * * *